United States Patent [19]

Kalle

[11] Patent Number: 5,259,566

[45] Date of Patent: Nov. 9, 1993

[54] FLY REEL

[76] Inventor: Veteläinen Kalle, Kerotie 12, SF-96500 Rovaniemi, Finland

[21] Appl. No.: 820,592

[22] PCT Filed: May 23, 1991

[86] PCT No.: PCT/FI91/00160

§ 371 Date: Jan. 27, 1992

§ 102(e) Date: Jan. 27, 1992

[87] PCT Pub. No.: WO91/18503

PCT Pub. Date: Dec. 12, 1991

[30] Foreign Application Priority Data

May 28, 1990 [FI] Finland ................... 902642

[51] Int. Cl.⁵ .......................... A01K 89/016
[52] U.S. Cl. ........................ 242/257; 242/317
[58] Field of Search ............. 242/257, 283, 284, 317

[56] References Cited

U.S. PATENT DOCUMENTS

| 715,274 | 12/1902 | Konigsberg | 242/283 |
| 802,219 | 10/1905 | Kleinman et al. | 242/257 |
| 2,184,149 | 12/1939 | Marr | 242/257 |
| 2,574,718 | 11/1951 | Swigerd | 242/ |
| 3,498,561 | 3/1970 | Smith | 242/284 |
| 4,560,118 | 12/1985 | Weber et al. | 242/255 |

FOREIGN PATENT DOCUMENTS 446598 5/1936 United Kingdom .

Primary Examiner—Katherine Matecki
Attorney, Agent, or Firm—Pollock, Vande Sande & Priddy

[57] ABSTRACT

The invention relates to a fly reel, comprising a reel body portion (1), a line holder (2) journalled to the body portion (1) and rotatable relative thereto, a rotating linkage (A), as well as a transmission system (B) between the rotating linkage (A) and the line holder (2) for transmitting the rotating motion of rotating linkage (A) into the rotating motion of line holder (2). The rotating linkage (A) is provided with elements (13, 15, 16) for disconnecting transmission whenever a fly-fishing person no longer contacts rotating linkage (A) to produce the rotating motion of line holder (2) and transmit power. Thus, the reel crank does not rotate even if line were running out of the reel.

6 Claims, 3 Drawing Sheets

FLY REEL

FIELD OF THE INVENTION

The present invention relates to a fly reel, comprising a reel body portion, a line holder journalled to the body portion and rotatable relative thereto, a rotating linkage, as well as a transmission system between the rotating linkage and the line holder for transmitting the rotating motion of the transmission linkage into the rotating motion of the line holder whenever a fly fisher is in a power-transmitting contact with the rotating linkage for the rotating motion of the line holder.

BACKGROUND OF THE INVENTION

The reels for fly fishing rods include a line holder or a spool rotatable by means of a crank around a horizontal center axle thereof. The reels are usually designed in a manner that the line holder is rotatable around an axle mounted in the middle of a left-hand end plate included in the reel. A crank for rotating the line holder is fastened to a right-hand end plate included in the reel and the crank movement is transmitted through the intermediary of gears fitted between the right-hand end plate of the reel and the line holder into the rotating motion of said line holder. The crank rotates as line is unwound from the reel.

When a lure has caught a large fish, such as a salmon, such a fish may swim at a speed of up to 100 km/h upstream or downstream carrying the lure along. The line runs out of a reel at the same speed and, therefore, the crank of a reel rotates at such a high speed that a grip must be released from the crank. The rotating crank is also easily caught by a piece of clothing, and, if the fisherman is rowing a boat, for example, by the boot legs. It also strikes fingers when handling the reel. The result is often breakage or tangling of the line.

SUMMARY OF THE INVENTION

In the fly reel of the present invention the above drawbacks are avoided by providing the rotating linkage with means for disconnecting the transmission as the application of a force is stopped. When the line is reeled in a line holder, a force producing the rotating motion of the line holder includes, in addition to a component force acting on the crank and in the direction of rotating motion, a component force which is perpendicular to the plane of rotating motion and, in the present example, acts towards the reel body portion. When the grip is released, a return spring included in the rotating linkage serves to return the pivoted lever to a neutral position to stop rotation of the crank and, thus, to facilitate handling of the fishing tackle.

The invention will now be described with reference made to the accompanying drawings, in which

DETAILED DESCRIPTION OF THE INVENTION

Figure 1:
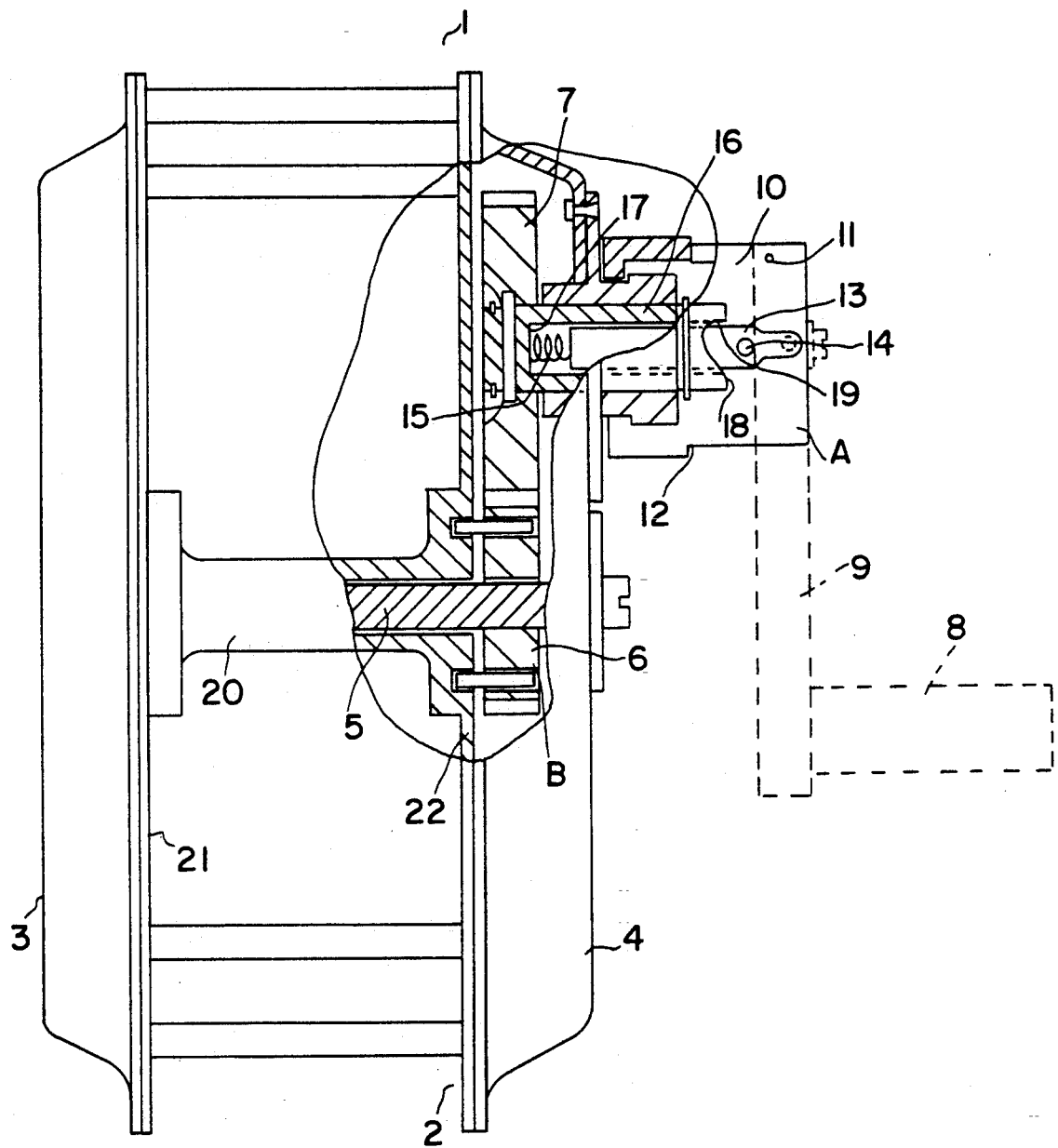
FIG. 1 shows reel according to the present invention partially cut away at a right-hand end plate.
Figure 2:
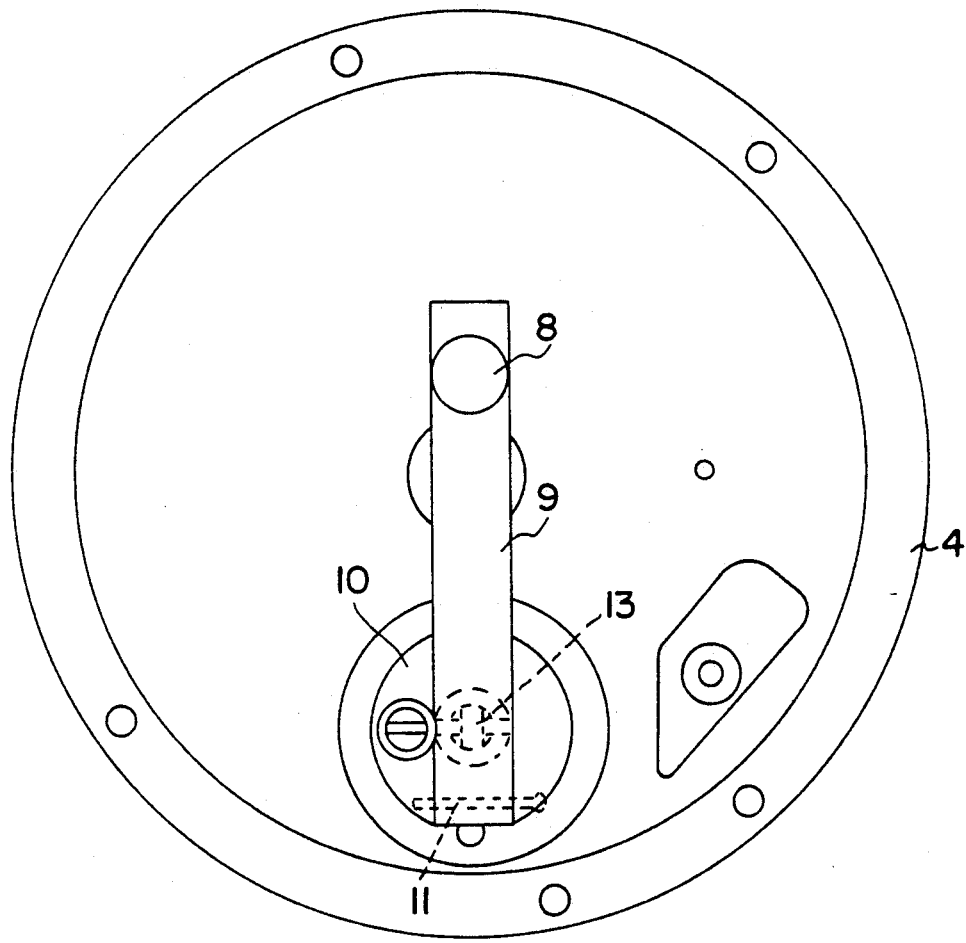
FIG. 2 shows the reel of FIG. 1 in a side view.
Figure 3:
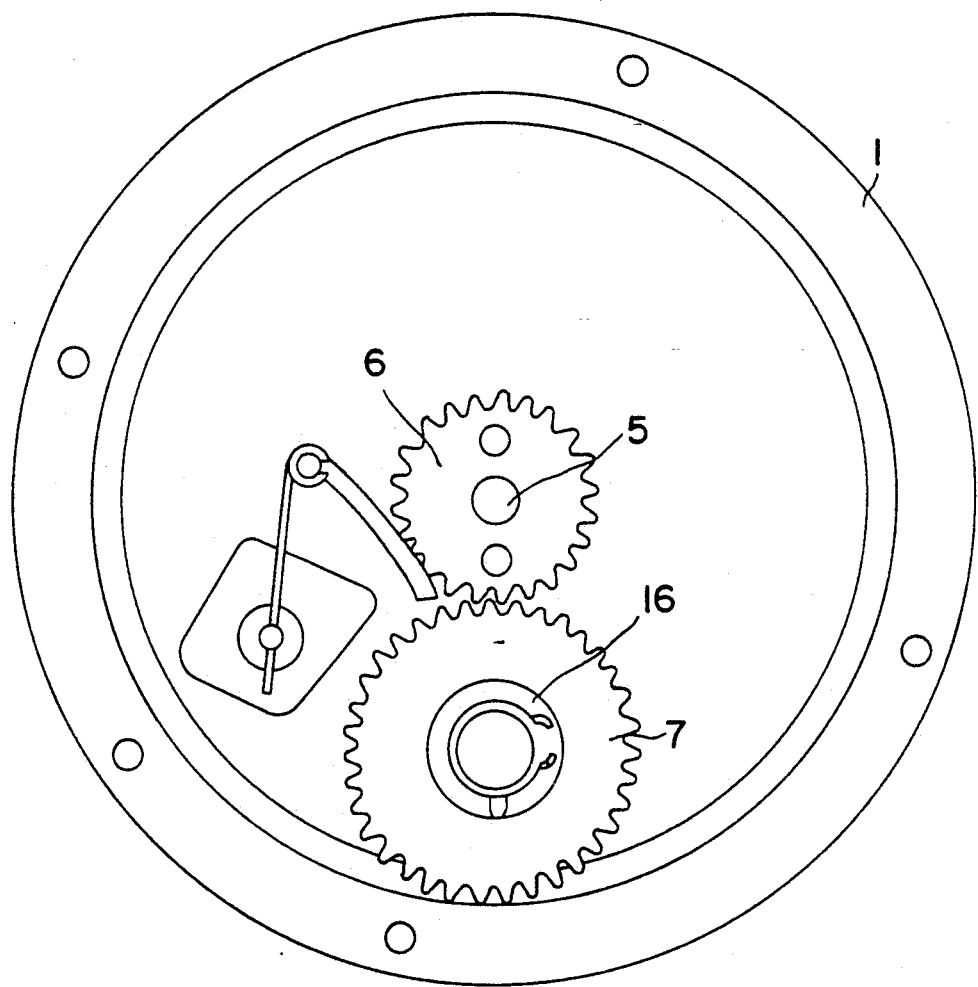
FIG. 3 shows the reel of FIG. 1 in a side view and with an end plate opened.

Referring to FIGS. 1-3, a fly reel of the present invention includes in the present embodiment as main components a reel body portion 1 having a line holder 2 fitted inside of it. The reel portion is provided with left-hand and right-hand reel end plates 3 and 4 which, by virtue of the arched shape thereof, provide a box-like assembly together with line holder 2. The reel is designed in a manner that the line holder 2 is rotatable around an axle 5 mounted in the middle of left-hand end plate 3. A crank comprising handle 8 and lever arm for rotating the line holder is fastened to right-hand end plate 4 of the reel through the intermediary of an auxiliary block 10. The movement of crank handle 8 is transmitted through the intermediary of this rotating linkage A journalled to the body portion and a transmission system B fitted between right-hand end plate 4 of the reel and line holder 2 into the rotating motion of line holder 2.

The line holder 2 includes two circular and flat holder walls 21 and 22 which are perpendicular to axle 5 and spaced from each other. The walls are connected to each other by means of a sleeve-like member, a line holder shaft 20. When the reel is in an assembled condition, the reel axle 5 is fitted inside the line holder shaft 20. The line holders of fly reels are narrow and they have a large circumference for a holder to accommodate a sufficient amount of line.

As shown in FIG. 1, a rotating linkage A for transmitting the rotating motion of the crank comprises, in addition to crank handle 8, a lever arm 9 as well as an auxiliary block 10, that is, a lever housing, for lever arm 9. Lever arm 9 is attached and linked to auxiliary block 10 pivotably by means of a pin at a linking point 11. The linking point 11 is located at the first, edge of auxiliary block 10 and the second edge of the auxiliary block, the opposite edge in terms of linking point 11, is provided with a recess 12. When line is reeled in line holder 2, the crank is urged towards reel body portion 1, the lever arm 9 being pressed into recess 12. Auxiliary block 10 is rotated as the crank is rotated. The rotating linkage A is mounted on right-hand end plate 4 of the reel by means of a sleeve-like and flanged attachment element.

Rotating linkage also includes means 13, 15, 16 for disconnecting transmission, comprising two elements 13, 16 between lever arm 9 and a transmission system B, elements 13 and 16 extending parallel to the axis of rotating linkage A and adapted to be movable relative to each other for establishing a transmitting connection. In addition, the elements 13 and 16 are provided with a preferably spring-like element 15 for the relative displacement thereof in axial direction for releasing the transmitting connection.

Lever arm 9 is fitted with another pin-like element 13 which is parallel to the axis of rotating linkage A. By its second end said element 13 is fastened to lever arm 9 at a small distance from lever arm linking point 11, in the present example by means of a pin, and by its first end it is supported by spring-like element 15. The element 13 is further provided with fastening means 14 extending therefrom for supporting the longitudinal, reel body portion 1 facing lower edge of lever arm 9. In the present example, the fastening means 14 is provided by a transverse pin extending through element 13 and including end members which protrude from said element 13 and provide said fastening means 14.

In the present embodiment, a transmission system B includes gears 6 and 7. According to FIG. 3, the reel includes a first gear 6 which is removably mounted on the end of line holder shaft 20 by means of pins. This gear is driven by a larger-diameter second gear 7 which is set in parallel relationship with first gear 6 thereabove. Second gear 7 is fastened to a first element 16 included in rotating linkage A and extending parallel to the axis of rotating linkage A, said fastening being effected by means of a pin running transversely through said element The first element extending parallel to the axis of rotating linkage A is provided with an axial cavity 17 opening towards lever arm 9 and intended to hold spring-like element 15 and said second element 13 extending parallel to the axis of rotating linkage A. When the rotary movement of the rotating linkage is transmitted through element 13 to element 16 and further into the rotating motion of gears 6 and 7, the result will be the rotation of line holder 2.

According to the present invention, the operative connection between rotating linkage A and transmission system B is resolved in a manner that the lever arm 9 facing edge of element 16 is provided with two grooves which provide profiled sections 18 for engaging fastening means 14 formed on element 13. When the line is to be reeled in line holder 2, the crank handle 8 is pressed towards the reel, whereby the lever arm 9 is pressed in recess 12 formed in auxiliary block 10, as already described above. At the same time, lever arm 9 presses element 13 towards the bottom of cavity 17 in element 16 and fastening means 14 carried by element 13 is pressed against profiled section 18 and slide, upon rotating the crank, to the bottom of profile sections 18 and is fixed behind locking surfaces 19 included in the profiled sections and extending substantially parallel to the axis of rotating linkage A. Thus, the rotating motion of crank handle 8 is transmitted to element 16 so as to rotate line holder 2. The speed of a line may be, for example, 1.5 times the rotating speed of the crank. When the grip from crank handle 8 is released, the spring-like element 15, which in the present example is a coil spring fitted between element 13 and element 16, returns the lever arm 9 to a position for releasing the fastening means 14 from locking surfaces 19 and the rotating motion of crank handle 8 and lever arm 9 stops despite the fact that line is still running out of line holder 2. The rotating motion of line holder 2 only rotates the crank movement in a pressed-down position of the lever arm. In other words, when line is freely running out of the reel, the crank 8 does not rotate. The invention is not limited to the above embodiment but it can be modified within the scope of the annexed claims.

I claim:

1. A fly reel comprising a reel body portion, a rotatable line holder journalled to said body portion and rotatable relative thereto, a rotatable linkage rotatably mounted to said body portion and rotatable about an axis, transmission means connecting said rotatable linkage with said line holder for transmitting rotating motion of said rotatable linkage into rotating motion of said line holder, and crank means comprising and a lever arm connected to said rotatable linkage and a handle mounted at one end of said lever arm, said rotatable linkage including interconnection means for connecting and disconnecting said crank means from said rotatable linkage, said interconnection means comprising:

a first elongated member having an axis extending parallel to the axis of said rotatable linkage and having inner and outer end portions and an axial cavity extending lengthwise thereof, said inner end portion being fixedly secured to said transmission means, and said outer end portion extending toward said crank means;

a second elongated member axially aligned with said first member and positioned within said axial cavity, said second member having inner and outer end portions, said outer end portion of said second member being fixedly secured to said lever arm of said crank means and including means for drivingly engaging said outer end portion of said first member when said lever arm is moved in an inward axial direction; and, spring means mounted within said cavity and extending between the inner end portions of said first and second members to urge said second member axially outward for disengaging said crank means from said transmission means.

2. A fly reel according to claim 1 wherein said rotatable linkage includes a lever housing, having first and second opposite edges, said first edge being pivotally linked to said lever arm and said second edge having a recess for movement therein of said lever arm toward said reel body portion.

3. A fly reel according to claim 1 wherein said spring means comprises a coil spring mounted between said inner end of said first elongated member and said inner end of said second elongated member.

4. A fly reel according to claim 1 wherein said first elongated member of said interconnection means is provided with at least one profiled section at said outer end portion thereof, and said second elongated member of said interconnection means is provided with at least one fastening means for drivingly engaging said profile section and for providing a power-transmitting connection between said crank means and said transmission means.

5. A fly reel according to claim 1, wherein said transmission means comprises a first gear connected to said rotatable linkage to rotate therewith, and a second gear mounted parallel to and meshing with said first gear, said second gear connected to said line holder to rotate therewith.

6. A fly reel according to claim 5 wherein said first and second drive gears have a transmission ratio of first gear:second gear of at least about 1:1.5.

* * * * *